United States Patent
Bunker et al.

(10) Patent No.: US 11,895,999 B2
(45) Date of Patent: *Feb. 13, 2024

(54) PEST CONTROL DEVICES, METHODS, AND APPARATUS

(71) Applicants: Brett E. Bunker, Kent City, MI (US); Chandra L. Maleckas-Bunker, Kent City, MI (US)

(72) Inventors: Brett E. Bunker, Kent City, MI (US); Chandra L. Maleckas-Bunker, Kent City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,968

(22) Filed: Apr. 19, 2022

(65) Prior Publication Data

US 2022/0240493 A1 Aug. 4, 2022

Related U.S. Application Data

(63) Continuation of application No. 16/417,154, filed on May 20, 2019, now Pat. No. 11,304,413, which is a
(Continued)

(51) Int. Cl.
| | |
|---|---|
| *A01M 1/02* | (2006.01) |
| *A01M 1/10* | (2006.01) |
| *A01M 1/14* | (2006.01) |
| *A01M 1/20* | (2006.01) |
| *F42B 12/50* | (2006.01) |

(Continued)

(52) U.S. Cl.
CPC ............... *A01M 1/02* (2013.01); *A01M 1/10* (2013.01); *A01M 1/106* (2013.01); *A01M 1/14* (2013.01); *A01M 1/20* (2013.01); *A01M 1/2027* (2013.01); *A01M 23/00* (2013.01); *A01M 99/00* (2013.01); *F42B 12/50* (2013.01)

(58) Field of Classification Search
CPC .......... A01M 1/02; A01M 1/10; A01M 1/106; A01M 1/14; A01M 1/20; A01M 1/207; A01M 23/00; F41B 12/66; F41B 15/10; F41B 11/80; F41H 13/0006
See application file for complete search history.

(56) References Cited

U.S. PATENT DOCUMENTS

| | | |
|---|---|---|
| 2,028,217 A | 1/1936 | Huffman |
| 2,055,841 A | 9/1936 | Haislip |

(Continued)

FOREIGN PATENT DOCUMENTS

| | | |
|---|---|---|
| EP | 0655603 B1 | 5/1995 |
| EP | 0872701 A2 | 10/1998 |

(Continued)

OTHER PUBLICATIONS

Gut, L.J. et al., "Behaviour-modifying Chemicals: Prospects and Constraints in IPM," Integrated Pest Management: Potential, Constraints and Challenges, pp. 73-121, 2004.

*Primary Examiner* — Magdalena Topolski
*Assistant Examiner* — Morgan T Jordan
(74) *Attorney, Agent, or Firm* — Dicke, Billig & Czaja, PLLC

(57) ABSTRACT

Devices and methods for pest control, including devices useful to place pest control devices at locations of use such as at a crop (e.g., at a branch of a tree), certain embodiments of devices including a capsule and a tether that can become tangled or caught in a tree or other crop location.

9 Claims, 13 Drawing Sheets

Related U.S. Application Data continuation of application No. 14/334,174, filed on Jul. 17, 2014, now abandoned, which is a continuation of application No. 13/000,710, filed as application No. PCT/US2009/003754 on Jun. 24, 2009, now abandoned, which is a continuation-in-part of application No. 12/146,436, filed on Jun. 25, 2008, now Pat. No. 8,024,889.

(51) Int. Cl.
*A01M 99/00* (2006.01)
*A01M 23/00* (2006.01)

(56) References Cited

U.S. PATENT DOCUMENTS

| | | | |
|---|---|---|---|
| 2,373,363 A | 4/1945 | Wellcome | |
| 2,780,963 A | 2/1957 | Dixon | |
| 2,899,103 A | 8/1959 | Ebert | |
| 3,095,867 A | 7/1963 | Kiyuna | |
| 3,115,061 A | 12/1963 | Sarvis et al. | |
| 3,190,179 A | 6/1965 | Benoit | |
| 3,254,565 A | 6/1966 | Fever et al. | |
| 3,913,446 A | 10/1975 | Grandy | |
| 4,058,928 A | 11/1977 | Digman, Sr. | |
| 4,160,335 A | 7/1979 | Von Kohorn et al. | |
| 4,400,909 A | 8/1983 | Reese | |
| 4,523,717 A | 6/1985 | Schwab | |
| 4,622,773 A | 11/1986 | Calagui | |
| 4,662,103 A | 5/1987 | Cheng | |
| 4,923,119 A | 5/1990 | Yamamoto et al. | |
| 5,048,224 A | 9/1991 | Frisch | |
| 5,163,242 A | 11/1992 | Smith | |
| 5,209,010 A | 5/1993 | Vickery | |
| 5,279,482 A | 1/1994 | Dzenitis et al. | |
| 5,315,932 A | 5/1994 | Bertram | |
| 5,353,712 A | 10/1994 | Olson | |
| 5,375,848 A | 12/1994 | Coleman | |
| 5,503,839 A | 4/1996 | Saguchi et al. | |
| 5,611,165 A | 3/1997 | Blaha | |
| 5,619,952 A | 4/1997 | Walker | |
| 5,622,314 A | 4/1997 | Eason | |
| 5,750,918 A * | 5/1998 | Mangolds | F42B 12/66 102/213 |
| 5,857,281 A | 1/1999 | Bergquist et al. | |
| 5,898,125 A * | 4/1999 | Mangolds | F41H 13/0031 102/504 |
| 5,988,036 A | 11/1999 | Mangolds et al. | |
| 6,001,346 A | 12/1999 | Delwiche et al. | |
| 6,088,949 A | 7/2000 | Nicosia et al. | |
| 6,102,301 A | 8/2000 | Tiedemann | |
| 6,112,452 A | 9/2000 | Campbell | |
| 6,216,960 B1 | 4/2001 | Aiba et al. | |
| 6,241,161 B1 | 6/2001 | Corbett | |
| 6,244,261 B1 | 6/2001 | West, Jr. | |
| 6,264,939 B1 | 7/2001 | Light et al. | |
| 6,339,897 B1 | 1/2002 | Hayes et al. | |
| 6,543,365 B1 | 4/2003 | Vasel et al. | |
| 6,554,887 B1 | 4/2003 | Inglis | |
| 6,675,789 B2 * | 1/2004 | Pearce, III | F42B 12/50 102/370 |
| 6,772,694 B1 * | 8/2004 | Pearce, III | F42B 12/50 102/370 |
| 6,857,579 B2 | 2/2005 | Harris | |
| 6,904,838 B1 * | 6/2005 | Dindl | B64D 45/0048 42/106 |
| 7,076,914 B1 | 7/2006 | Howse | |
| 7,325,358 B1 | 2/2008 | Chalupsky et al. | |
| 7,559,445 B1 | 7/2009 | Kulp | |
| 7,643,735 B1 | 1/2010 | Mast | |
| 9,730,438 B2 | 8/2017 | Messaros et al. | |
| 2004/0168363 A1 * | 9/2004 | Baker | A01M 1/2055 43/1 |
| 2004/0231231 A1 | 11/2004 | Cataldo et al. | |
| 2005/0199740 A1 | 9/2005 | Harris, Jr. | |
| 2006/0094573 A1 | 5/2006 | Weck | |
| 2007/0003980 A1 | 1/2007 | Woods et al. | |
| 2007/0137085 A1 | 6/2007 | Aske | |
| 2008/0011878 A1 | 1/2008 | Maples | |
| 2008/0044446 A1 | 2/2008 | McKibben | |
| 2009/0148399 A1 | 6/2009 | Bette | |
| 2009/0151710 A1 | 6/2009 | Zimmerman | |
| 2010/0126483 A1 | 5/2010 | Makowski | |
| 2016/0205920 A1 | 7/2016 | Messaros et al. | |
| 2017/0082276 A1 | 3/2017 | Mai et al. | |

FOREIGN PATENT DOCUMENTS

| | | | |
|---|---|---|---|
| GB | 2386673 A * | 9/2003 | F41B 15/10 |
| GB | 2386673 A | 2/2005 | |
| JP | 2003227700 A | 8/2003 | |

* cited by examiner

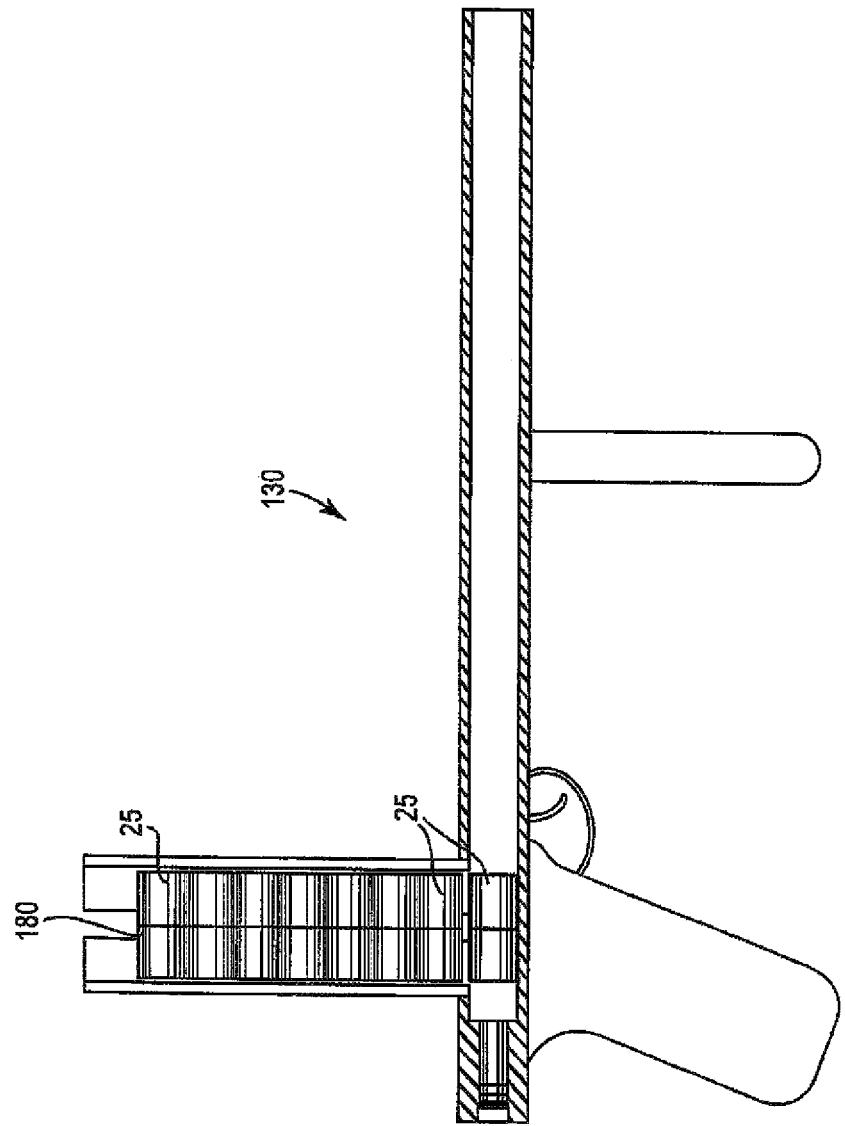

PEST CONTROL DEVICES, METHODS, AND APPARATUS

PRIORITY

This application is a continuation of U.S. patent application Ser. No. 16/417,154, file May 20, 2019, now U.S. Pat. No. 11,304,413, which is a continuation application of U.S. patent application Ser. No. 14/334,174, filed Jul. 17, 2014, which is a continuation application of U.S. patent application Ser. No. 13/000,710, filed Feb. 18, 2011, which claims benefit from International Application No. PCT/US2009/003754, filed on Jun. 24, 2009, which in turn claims priority to U.S. application Ser. No. 12/146,436, filed Jun. 25, 2008, now U.S. Pat. No. 8,024,889, entitled "Pest Control Method and Apparatus" which applications are incorporated herein by reference in their entireties.

FIELD OF THE INVENTION

The invention relate to pest control, including methods of dispensing a pest control device that may include a trap, active pest control agent, or other pest control system.

BACKGROUND

Pest control is an area of technology that can be considered in some respects mature, and yet the subject of constant innovation. General methods of pest control for insects include chemical pesticides and poisons, traps, and pheromone delivery. These methods can be applied to control pests in any agricultural, horticultural, or general outdoor environment. The pests may be insects, birds, or animals.

Much research and reporting occurs in these areas. See, e.g.: Gut, L., L. Stelinski, D. Thomson and J. Miller. 2004. Behavior-modifying chemicals: Prospects and constraints in IPM. In: Koul, O., Dhaliwal, G. S. and Cuperus, G. (eds) Integrated Pest Management—Potential, Constraints, and Challenges. CABI Press, N.Y., pp. 73-121; Gut, L. J, J. Wise, J. Miller, R. Isaacs & P. McGhee. 2000. New insect controls and pest management strategies. Proc. Mich. State Hort. Soc. 129: 66-75; and Gut, L. & J. Wise. 2003. Summer leafroller management. Fruit CAT Alert 18(12): 2. As has been reported, improved pest control is important for any variety of pest that can inhibit crop production, e.g., in apple, peach, cherry and grape industries, and for any variety of other fruits, vegetables, or other crops, that can be damaged by insect (or any pest). Examples of key pests of apples, peaches, cherries, and grapes belong to the insect order Lepidoptera. Codling moth (CM), oriental fruit moth (OFM), obliquebanded leafroller (OBLR), and redbanded leafroller (RBLR), are among the primary Lepidopteran tree fruit pests that cause direct damage to apples. OFM also is the principal fruit damaging pest of peach. Grape berry moth (GBM) is the principal insect pest of grape. The primary pest of cherry is a fruit fly, but several Lepidoptera, including OBLR, can cause significant crop loss as well. Effective control of these and other pests is a primary goal of agriculture.

Pheromone-based mating disruption (MD) is a promising alternative for managing lepidopteran pests (Gut et al. 2004). Disruption products have been developed for most of the key lepidopteran pests of fruit, and have been embraced as the principal means of controlling CM and OFM in the pacific coast states of California, Oregon and Washington, e.g. over 90% of the apple acreage (150,000 acres) is treated with CM MD (Witzgall et al. 2008). In contrast, less than 10% of the apple, grape and peach acreage in Michigan and other eastern fruit production regions have adopted MD (Don Thomson, Pacific Biocontrol, 2008). The high cost of disruption products and the need to supplement the pheromone treatment with companion insecticides are often noted as the primary obstacles to greater adoption. Increased reliance on this promising approach also has been impeded by the lack of consistency in the level of control achieved. Mating disruption fruit pests is at a juncture where its efficacy and reliability need to be significantly improved if MI fruit growers are to rely on this tactic as a primary control.

Pheromones are released in agricultural environments, such as orchards, nurseries, forests or treed-lands, swamps, and farms, to control insect reproduction and insect population so that plants and vegetation (vegetative) growth can be enhanced, or for the purpose of controlling insects. In some cases, the pheromones are disposed in the upper ⅓ of trees to decrease invading insects in fruit crops, such as apples.

A pheromone is a chemical substance that is usually produced by an animal and serves especially as a stimulus to other individuals of the same species for one or more behavioral responses. Pheromones can be used to disrupt mating of invading insects by dispensing the pheromones or the pheromone scent in the air, so the males' cannot locate the females, which disrupts the mating process. Pheromones can be produced by the living organism, or artificially produced. This pest control method does not employ insecticides, so the use of pheromones is safer for the environment, and for living organisms.

Currently, the relevant art includes tying pheromones onto branches by use of the pheromones being imbedded within "twisty-tie" like products. Pacific Biocontrol Corporation, of Litchfield Park, Arizona (pacificbiocontrol.com), makes and sells these types of pheromone products. These products require the user to manually, or by means of a rod-like extension, twist each product onto a branch, like one would apply the twisty-tie to close a trash bag. This is a labor intensive practice, especially for large orchards. (Other products use clips, spirals and puzzle shaped pieces to attach to branches.)

As can be seen, there is a need for faster ways to apply such pheromone systems.

SUMMARY

Pest control devices described herein can be projected toward a tree or other vegetation to become tangled or caught at a location to function as a pest control device, such as at a branch of a tree or at another location near a crop, tree, or plant. These methods can be applied to control pests in any agricultural, horticultural, or general outdoor environment. The pests may be insects, birds, or animals.

The devices can be useful in any location such as a forest, farm, nursery, neighborhood, yard, or tree-cropping system, especially locations where it can be otherwise difficult to place a pest control device (e.g., a top of a tree, a swamp, a high location within a barn or other building). The type of plant or tree that may be protected or treated is not limited, examples including apple tree, peach trees, cherry trees, olive trees, orange trees, nut trees, grape vines, berry bushes, and any other plants or locations where pest control devices are useful. The devices can be useful to protect or treat a group of plants or a single tree, such as with a large-scale infestation (e.g., protecting a single tree against Dutch Elm Beetle, Emerald Ash Borer, and the like). The devices can also be useful to protect against insects, animals, or other pests generally, as opposed to protection of a particular plant, trees or crop, such to control mosquito populations or to repel vermin or other animals.

The types of pests that may be controlled can be any pest affecting vegetation, trees, crops, or people, including insects, birds, and other animals. Non-limiting examples of plants, repellants, pests, attractants, etc., include: as useful non-insect attractants and repellants, e.g., deer and bird repellants: soap and tonnage; attractant plant volatiles may be a fruit essence or something extracted from an agricultural crop upon which an insect feeds, for example: Apple Essence, Pear Ester, Cherry Essence, Orange Essence, Benzaldehyde. Examples of insect pests that may be controlled include Order Diptera (Flies), including Olive Fly (optionally controlled by pheromone), Mediterranean Fruit Fly (Medfly), Peach Fruit Fly, *Ceratitis* Fruit Fly, Cherry fruit fly, Walnut Husk Fly (lured by ammonia attractant), Apple Maggot (lured by ammonia attractant); Order Homoptera (sucking insects), including California Red Scale, Yellow Scale, San Jose Scale; Order Coleoptera (Beetles), including Japanese Beetle (controlled using an aggregation pheromone), Oriental Beetle, Plum Curculio (controlled using benzaldehyde and an aggregation pheromone for its attractant); Order Lepidoptera (Moths and Butterflies), including Tufted Apple Bud Moth, Peachtree Borer, Grape berry moth, Oriental fruit moth, Gypsy moth; and Order Hymenoptera (Bees, Ants, and Sawflies), including Sawflies (these are mostly in forest crops), Fire Ants, and Ants (controlled by use of an attractant such as sugar). These examples being merely illustrative, the invention can be useful to control other pests using other active agents or pest control systems. Examples of information related to other pests that may be controlled, and other active agents, etc., can be found in books and online at various websites, such as the following: www.epa.gov/pesticides/biopesticides; www.epa.gov/oppbppdl/biopesticides/ingredients/factsheets/factsheet_lep_pheromones.htm#moth; and www.pherobase.com.

Described devices can include a pest control system or mechanism such as a trap, pesticide, poison, pheromone, or other active agent capable of pest control. Many varieties of natural and synthetic pest control agents such as herbicides, pesticides, fungicides, and poisons, and many varieties of attractants and traps, are known and commercially available and can be useful in a device as described. Other useful traps, pesticides, attractants, pheromones, and active agents and systems will be discovered in the future and may be useful with a describe device. An active agent, trap, attractant, or other feature of a pest control system can be incorporated into a described device and propelled from a launcher. A device including an active agent can include a coating (adhesive or other coating), a powder or dusting, or any component of the device (tether or capsule segment) to contain or release the active agent. The device can include a tether attached at one or both ends to a capsule or capsule segment; e.g., a tether can hold together two segments of a launchable device such as a launchable capsule. The device can take on at least two states, a deployable state and an attachment state.

One aspect is an apparatus to project toward a tree to disburse a pheromone, comprising: a releaser (20) removably adjacent to a capsule (25) via an extension (120); whereby said releaser (20) and said capsule (25) are disposed adjacent to each other in a deployable state (180), then the releaser (20) separates from the capsule (25) but is still connected via said extension (120) whereby inertia or a propellant or gas can cause said releaser (20) to move away from said capsule (25) into an attachment state (200).

Another aspect is a method of applying a pheromone onto a tree branch, comprising: positioning a releaser (20) to a first end (122) of an extension (120); positioning a capsule (110) to a second end (124) of an extension (120); positioning the releaser (20) adjacent to the capsule (110) so that the member (10) is in a deployable state (180); projecting the member (10) in its deployable state (180) whereby inertia causes said releaser (20) to separate from said capsule (110) and form an attachment state (200).

Another aspect is a method of applying a pheromone to a tree, comprising the steps of: positioning (340) a releaser (20) to a capsule (110) via an extension 120; positioning (320) said releaser (20) adjacent to said capsule (110) so that said member (10) is in a deployable state (180); and projecting (330) said member (10) in said deployable state (180) whereby inertia causes said releaser (20) to separate from said capsule (110) and form an attachment state (200).

In another aspect the invention relates to a pest control device. Embodiments of the device can include a capsule and a tether attached at one end to the capsule, the other end being loose. In other embodiment a capsule can include: two opposing capsule segments; a tether having two ends, each end connected to an opposing capsule segment; the capsule segments being capable of being engaged in a deployable state, the capsule segments capable of being separated to an attachment state wherein the capsule segments are attached by the tether, wherein the pest control device includes a pest control device such as a pest trap, a pest control active agent, or both.

In another aspect the invention relates to methods of using a pest control device. A method can include placing a pest control device by providing a device or apparatus as described, in a deployment state, and propelling the device toward a plant, wherein the device takes on an attachment state and attaches to the plant.

Other aspects of the invention include: a pest control device as substantially described herein; a pest control device as substantially described herein, in combination with a launcher; and a method of pest control as substantially described herein.

These and other features, aspects, and advantages of the invention will become better understood with reference to the following drawings, description and claims.

BRIEF DESCRIPTION OF THE DRAWINGS

FIG. 5 is a pictorial view of a gun that may be used to deploy a member of the present invention;

DETAILED DESCRIPTION

Figure 1:
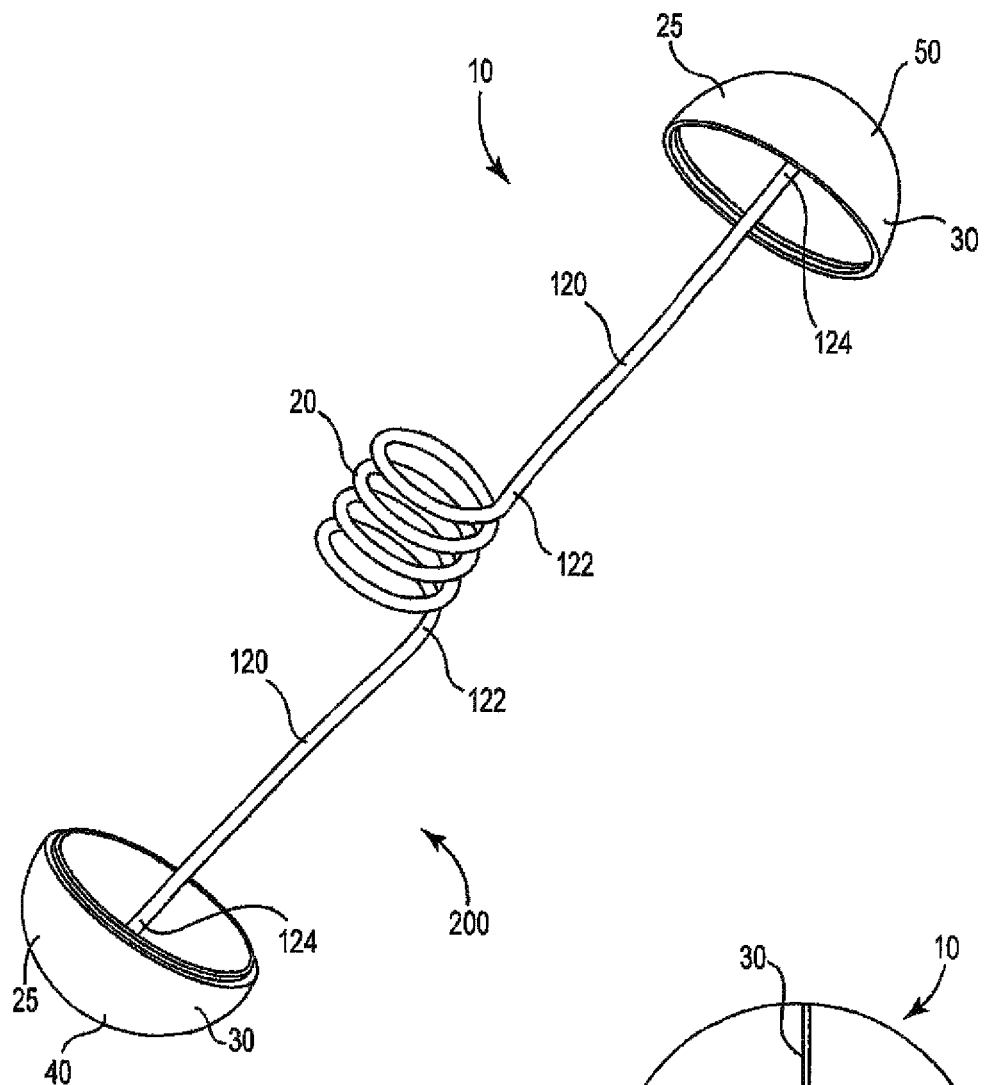
FIG. 1 is a pictorial view of one embodiment of a member of the present invention in an open position or attachment state.
Figure 2:
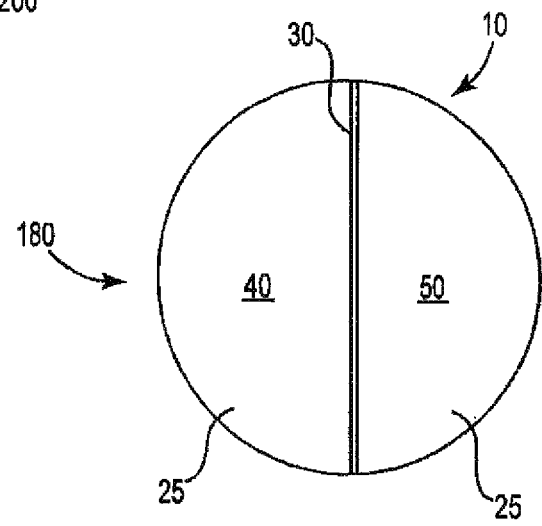
FIG. 2 is a pictorial view of the first embodiment of the member of the present invention in a closed position or deployable state.
Figure 3:
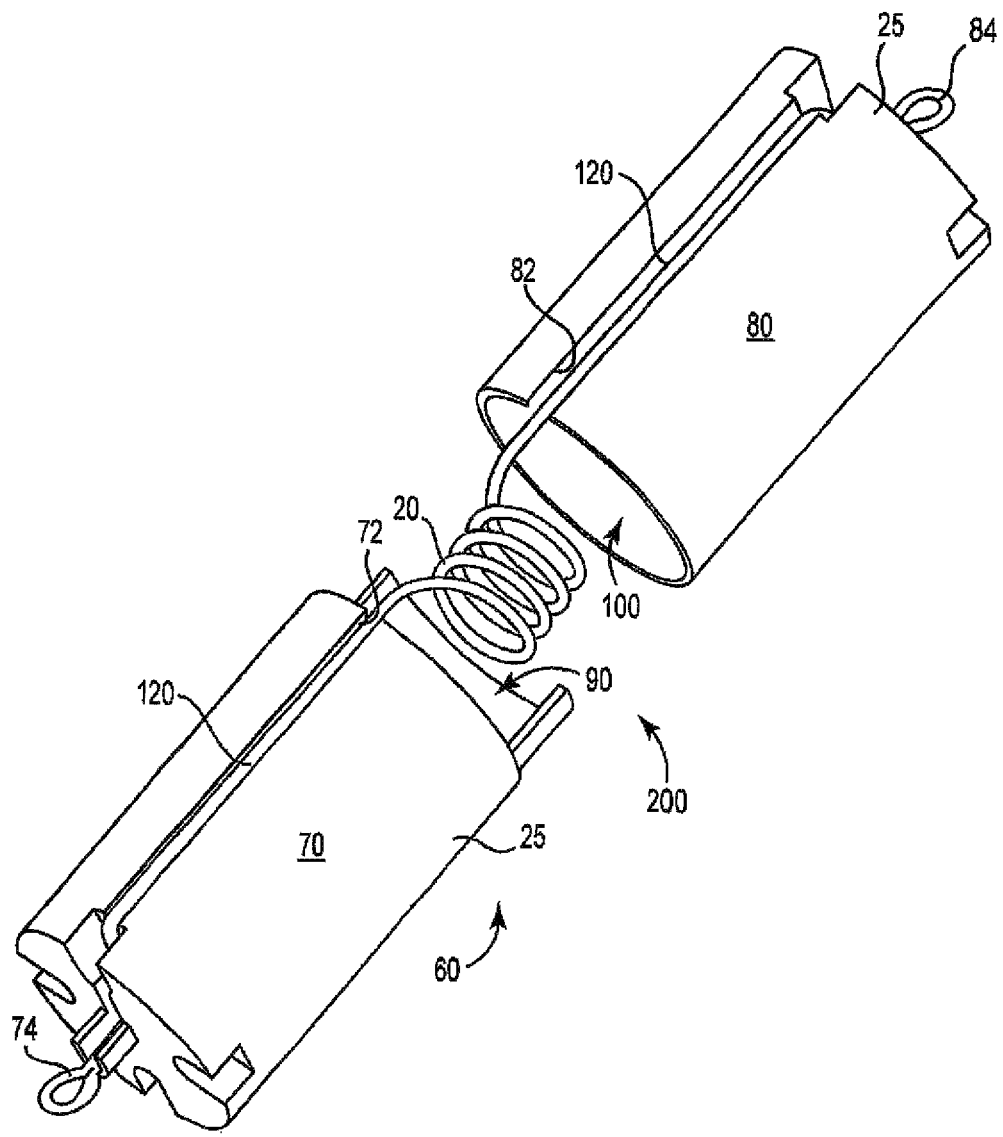
FIG. 3 is a pictorial view of a second embodiment of a member of the present invention in an open position or attachment state.

The following detailed description is of the best currently contemplated modes of carrying out the invention. The description is not to be taken in a limiting sense, but is made merely for the purpose of illustrating the general principles of the invention, since the scope of the invention is best defined by the appended claims.

REFERENCE NUMERALS 10 member
20 releaser
25 capsule
30 capsule type I
40 first capsule I portion
50 second capsule I portion
60 capsule type II
70 first capsule II portion
72 first groove
80 second capsule II portion
82 second groove
90 first capsule II hollow interior
100 second capsule II hollow interior
110 capsule III
120 extension
130 gun
180 deployable state
200 attachment state
300 positioning a releaser to a first end of an extension
310 positioning a capsule to a second end of an extension
320 positioning the releaser adjacent to the capsule
330 projecting the member in its deployable state
340 positioning a releaser to a capsule via an extension Generally, a useful pest control device according to this description can be a device that can be projected toward a tree to become tangled or caught on a branch, and that includes a pest control device such as a trap (e.g., a closed compartment or an adhesive), attractant, repellant, pesticide, poison, pheromone, or other active agent capable of pest control. The active agent can be incorporated into the device as desired, such as within a matrix, a coating (adhesive or other coating), or within the device or by being incorporated into a component of the device (tether or capsule segment).

In preferred embodiments the device can include a tether that extends from the device to become tangled, upon launch. The tether can be connected at one end to a single capsule, which can together be placed in a deployment state (see e.g., FIG. 9) and launched. Upon launch the tether extends from the capsule (see FIG. 10) and can wrap or tangle in a tree or other plant or crop. A second end of the tether can be unattached, or can be attached to or include a weight or other mechanism to allow extension from the capsule by inertia upon launch. In other embodiments the tether can connect two opposing sections of a launchable device. When released the tether can hold the two sections of the launchable device together. Devices can take on at least two states, a "deployment" or "deployable" state (e.g., closed state) and an attachment (e.g., open) state.

In certain embodiments, in a deployable state, two opposing segments of a device (e.g., capsule segments) can be located near each other to be a compact device and frictionally (using of adhesive) engaged to remain together. The tether the tether can be wound, bundled, or wrapped, inside of the device or external to the device, and can be attached at one or two ends to sections of a launchable capsule. The device in a deployable state can preferably be placed within and projected by a launcher, whereupon launching causes the device to assume an attachment state, e.g., characterized by an extended tether. In the attachment state the tether becomes extended, and (in embodiments having two segments of a capsule) two opposing segments can become separated, e.g., by inertia or another force produced by the launcher, or by gas from the launcher passing through a segment to create a relative high pressure within the device. The two segments in the attachment state remain connected together by the tether. Releaser containing pheromone can separate from the capsule (i.e., becomes separated from one or another segment of a capsule or the tether). The segment or segments, and tether, projected at a tree, can become caught or tangled on a branch.

The device can be, for example, a capsule having one segment attached to a tether, or two opposing segments that fit together. The device in a deployable state can preferably have a streamlined form, to be launched, and upon launch the tether can be extended from one segment; e.g., two opposing segments connected by a tether can become separated upon being launched. The fit between a tether and a segment, or two opposing segments, allows separation due to a small amount of force.

An example of a capsule can be in the form of two opposing hemi-spherical halves that define an internal volume that can contain the tether. Another example of a capsule can be a cylindrical shell segment and a streamlined (e.g., spherical, pointed, or bullet-shaped) cap, that also defines an internal volume that contains a tether. Yet another example of a capsule can be a single shell segment or two opposing cylindrical shell segments. The segment or segments define an internal volume; the tether can be internal to or external to (e.g., wrapped around) the cylindrical shell.

The capsule can be made of any useful material such as a natural or synthetic polymer or plastic, paper, metal, woven or non-woven mesh or fabric, etc., and can optionally be impregnated or coated with an attractant, adhesive, pheromone, pesticide, poison, etc. A capsule can include an enclosure that allows entry of an insect and encloses any one or more of an attractant, adhesive, pheromone, pesticide, poison, etc. The size and shape of the capsule can be as desired, defining a volume allowing the capsule to be launched when in the deployable state. Preferably the shape of the capsule in a deployable state can be aerodynamic, to allow launching of the capsule, to reach a location for controlling pests such as at a location of a crop, e.g., at a treetop.

The tether includes two ends. In certain embodiments one end is attached to a capsule and one end is un-attached or may be attached to a weight or other feature to allow the tether to extend from the capsule upon launch. In other embodiments, one end of a tether is attached to a first capsule segment and the other end is attached to an opposing segment, of a launchable device (e.g., capsule).

A tether can be made of any useful material such as a natural or synthetic polymer or plastic, metal, paper, woven or non-woven mesh or fabric, etc., e.g., in the form of a rope or string, and can optionally be impregnated or coated with an attractant, adhesive, pheromone, pesticide, poison, another active agent, etc. The tether may be, for example, a segment of twine or rope that can coil within or outside of a capsule in a deployable state and become extended in an attachment state. A length can be any useful length, such as from 3 to 25 inches, e.g., from 4 to 15 inches, though lengths outside of these ranges may also be useful.

An active agent (e.g., attractant, herbicide, pesticide, fungicide, poison, pheromone, biologic agent, etc.,) of a pest control device can be located at any portion of the device within a component of the device (segment of a capsule, tether, etc.), can be located as a coating or separate component of the device attached to the tether, as part of a capsule segment, or otherwise contained in a capsule, e.g., in the form of powder or liquid contained in the device. A fabric or polymeric material may be impregnated with active substance and can be attached to a segment of the capsule or to the tether, e.g., as a tab attached to the tether that can optionally move along the length of the tether, or be stationary. Alternately, an active agent can be incorporated into a release matrix such as a controlled release matrix, and attached to a capsule segment or the tether, e.g., with a release matrix, as a "wad." A release matrix can include a base material into which the active agent can be incorporated and from which the active agent will release over time, such as a natural or synthetic polymer, a wax, a clay, a powder, a coating, an adhesive, etc. According to certain embodiments, a capsule, capsule segment, or tether, can contain or be coated with active agent, an attractant, poison, pheromone, biologic agent, etc.

One type of pest control system that can be used with the present invention is mating disruption, e.g., involving a pheromone as an active agent. Mating disruption uses an insect's own communication system to its detriment. As a single example, in the wild, female moths release a sex pheromone into the air to attract male moths. According to the use of pheromones to inhibit mating, pheromone is released and male moths detect the pheromone "scent" and follow the scent upwind to locate and then mate with the females. By use of pheromone to control mating, pheromone is released, to saturate air with released pheromone, preventing male moths from locating females, thereby is suppressing mating. A mating disruption product can contain any one of known (e.g., registered) attractants, pheromones, etc.

An example of a pest control product for Codling moth can contain (E, E)-8,10-Dodecadien-1-ol (129028), or a derivative. The pheromone can be placed at a location within a pest control device (e.g., capsule) as described herein, to be released upon deployment of the device in an attaching state, when launched and attached, e.g., to a tree.

Another pest control device can include an "attract and trap" system that involves luring an insect with an attractant, into an enclosure from which the insect is unable escape, and where the insect eventually dies. The concept is similar to the "Roach Motel" roach traps that are commercially available. The attractant can be a substance that attracts the insect, and the trap may include an enclosure, a sticky substance such as an adhesive, or both. The attractant can be located anywhere on the pest control device such as internally (in the deployment state), and optionally within a release matrix. The attractant can also be incorporated into plastic of a segment of the device or within the tether. Examples of useful attractants include plant volatiles, kairomones (aggregation pheromones), ammonia (for insects), sugar (e.g., for ants), sex pheromones, and others.

In one embodiment of an attract and trap device an adhesive can be located on surfaces on an inside of a capsule or capsule segment, e.g., as a coating on an interior surface of a capsule segment. Insects access the adhesive by either crawling or flying into the capsule or capsule segment. The adhesive could also be contained inside of a closed compartment having an opening large enough for the insect to enter, but that limits the amount of space an insect would have to enter and exit. This would also prevent dirt from entering the sticky area (adhesive) and clogging the sticky area. Other embodiments include an enclosure as part of a capsule or capsule segment that allows an insect to enter, and need not include an adhesive. The segments of a capsule could be as described herein, and may optionally include a cylindrical base having a hole at the bottom to allow an opposing segment (e.g., "cap") to be blown off when launching, and optionally to allow an attractant or pheromone to form a plume to attract the insect, when launched.

Additionally or alternately, a segment of a capsule could include an extended surface such as a fin or wall that includes adhesive as a trap. Attractant could be included at the fin (e.g., within the adhesive) or elsewhere as part of the device. A fin (e.g., in the shape of an elongate "x") could extend from one or both segments of a capsule. As an example, a fin could extend longitudinally away from a capsule segment and toward an opposing capsule segment. The fin could be internal to a capsule in a closed (deployable) state and could become exposed in an open (attachment) state. The fin or other extension could be coated with adhesive or tangle foot, to trap an insect that crawls or lands on the surface. This would increase trapping surface area.

Yet another pest control device could use an "attract and kill" mechanism, which lures an insect to the device and includes a substance that can quickly or eventually kill the insect, e.g., a pesticide, poison, biological agent, etc. A segment of a capsule can contain a substance (e.g., an adhesive, powder, coating, etc.) that contains a contact pesticide that kills an insect that contacts the substance. The pesticide could work by any mechanism, such as by poison, e.g., a stomach poison, a biological agent such as Codling moth granulosis virus, a Molt accelerator, diatomaceous earth, or any other kind of ingestible poison. The capsule could optionally include a container and an aperture to limit entry or exit from the container, and optionally an adhesive coating. When the insect entered, the insect can become overwhelmed with dust such as diatomaceous earth, or poison, in all its openings and die either immediately or soon after contact.

Many commercially available pest control agents are known and more will be developed in the future. Very many active pest control agents are know or will be developed in the future, which can be included in a device described, optionally in a form that controls release. Examples include the following.

Figure 7:
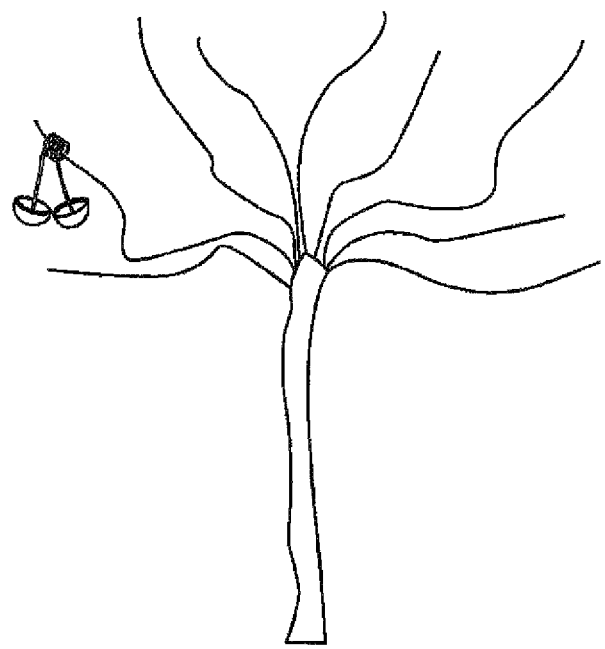
FIG. 7 is a pictorial view of a member being applied to a tree branch.
Figure 8:
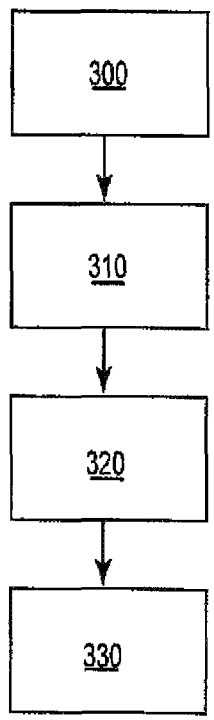
FIG. 8 is a pictorial of a schematic of a method of the present invention.

For uses as attractant for gravid female mosquitoes: the pheromone heterocyclic diasteroiomeric lactone mixture, (5R,6S)-hexadecanolide, 3-Methyl indole, lactone, epsilon-caprolactone, 6-hexanoloctone, 6-pentyl-alpha-pyrone, phenol, p-cresol, 4-ethylphenol, 4-methylphenol, indole, 3-methylindole, nonanal, 2-undecanone, 2-tridecanone, naphthalene, dimethyltrisulfide, dodecanoic acid, tetradecanoic acid, (Z)-9-hexadecanoic acid, hexadecanoic acid, (Z)-9-octadecanoic acid, octadecanoic acid and n-heneicosane; the following bacteria/fungus group and their underlying chemical derivatives: *Enterobacter cloacae*, acinitobacter *calcoaceticus, psychrobacter immobilis, Bacillus cereus, Trichoderma viride, polyporus* spp., aerobacter *aerogenes, sphingobacterium multivorum*, trichodermin, alamethicin, trichoviridin, and trichotoxin. See United States Patent Application Publication 2009/0148399, incorporated herein by reference.

Examples of herbicidal compounds can include, for example, amide herbicides, anilide herbicides, arylalanine herbicides, chloroacetanilide herbicides, sulfonanilide herbicides, sulfonamide herbicides, thioamide herbicides, antibiotic herbicides, aromatic acid herbicides, benzoic acid herbicides, pyrimidinyloxybenzoic acid herbicides, pyrimidinylthiobenzoic acid herbicides, phthalic acid herbicides, picolinic acid herbicides, quinolinecarboxylic acid herbicides, arsenical herbicides, benzoylcyclohexanedione herbicides, benzofuranyl alkylsulfonate herbicides, benzothiazole herbicides, carbamate herbicides, carbanilate herbicides, cyclohexene oxime herbicides, cyclopropylisoxazole herbicides, dicarboximide herbicides, dinitroaniline herbicides, dinitrophenol herbicides, diphenyl ether herbicides, nitrophenyl ether herbicides, dithiocarbamate herbicides, halogenated aliphatic herbicides, imidazolinone herbicides, inorganic herbicides, nitrile herbicides, organophosphorus herbicides, oxadiazolone herbicides, phenoxy herbicides, phenoxyacetic herbicides, phenoxybutyric herbicides, phenoxypropionic herbicides, aryloxyphenoxypropionic herbicides, phenylenediamine herbicides, pyrazole herbicides, benzoylpyrazole herbicides, phenylpyrazole herbicides, pyridazine herbicides, pyridazinone herbicides, pyridine herbicides, pyrimidinediamine herbicides, quaternary ammonium herbicides, thiocarbamate herbicides, thiocarbonate herbicides, thiourea herbicides, triazine herbicides, chlorotriazine herbicides, methoxytriazine herbicides, methylthiotriazine herbicides, triazinone herbicides, triazole herbicides, triazolopyrimidine herbicides, uracil herbicides, urea herbicides, phenylurea herbicides, sulfonylurea herbicides, pyrimidinylsulfonylurea herbicides, triazinylsulfonylurea herbicides, thiadiazolylurea herbicides, unclassified herbicides, and the like.

Examples of fungicidal active ingredients include fungicidal chemicals can include, for example, aliphatic nitrogen fungicides, amide fungicides, acylamino acid fungicides, anilide fungicides, benzanilide fungicides, furanilide fungicides sulfonanilide fungicides, benzamide fungicides, furamide fungicides, phenylsulfamide fungicides, sulfonamide fungicides, valinamide fungicides, antibiotic fungicides, strobilurin fungicides, aromatic fungicides, benzimidazole fungicides, benzimidazole precursor fungicides, benzothiazole fungicides, bridged diphenyl fungicides, carbamate fungicides, benzimidazolylcarbamate fungicides, carbanilate fungicides, conazole fungicides, copper fungicides, dicarboximide fungicides, dichlorophenyl dicarboximide fungicides, phthalimide fungicides, dinitrophenol fungicides, dithiocarbamate fungicides, imidazole fungicides, inorganic fungicides, mercury fungicides, morpholine fungicides, organophosphorus fungicides, organotin fungicides, oxathin fungicides, oxazole fungicides, polysulfide fungicides, pyrazole fungicides, pyridine fungicides, pyrimidine fungicides, pyrrole fungicides, quinoline fungicides, quinone fungicides, quinoxaline fungicides, thiazole fungicides, thiazolidine fungicides, thiocarbamate fungicides, thiophene fungicides, triazine fungicides, triazole fungicides, urea fungicides, unclassified fungicides, and the like.

A specific example of a pheromone compound is (Z,E)-9,12-tetradecadien-1-ol acetate and (Z)-9-tetradecen-1-ol acetate. See United States Patent Publication Number 2008/0044446 "Compositions and Methods for Attracting Noctuid Moths," incorporated herein by reference.

Additional specific examples of active pest control agents and pheromones include: (Z,8 Dodecen-1-yl acetate, E,8 Dodecen-1-yl acetate, Z,8 Dodecen-1-yl alcohol, e.g., in a 93:6:1 ratio by weight), for controlling Oriental fruit moth *Grapholita molesta*, in peaches and stone fruit; E,E 8,10 Dodecadien-1-yl alcohol for controlling moth flight in spring; E, beta-farnesene, the alarm pheromone of many aphid species optionally useful with the plant kairomones methyl salicylate, methyl jasmonate, and Z,3 Hexen-1-yl acetate; tea tree oil used for control of ant pests such as the Red Imported Fire ant, *Solenopsis invicta*. See, e.g., United States Patent Publication Number 2008/0011878 "Dispenser"; the entireties of each of these being incorporated herein by reference.

FIG. 1 illustrates one embodiment of the present invention. The member 10 may include components including a releaser 20 connected to a first end 122, and a capsule 25 connected to a second end 124 of an extension 120 as illustrated in FIGS. 9 and 10.

In another embodiment, the releaser 20 may be disposed between two extensions 120, and each extension 120 may extend outwardly and connect to a capsule 25.

The capsule 25 may be of any shape and it may be hollow if the releaser 20 or if the releaser 20 and the extension 120 are to be disposed within the capsule. As an example, the capsule 25 may be of a type referred to herein as capsule type I, capsule type II, or capsule type III; which are substantially interchangeable.

FIGS. 1 and 2 illustrate a hollow spherical shaped capsule type I. The capsule type I 30 may have a first capsule type I portion (or segment) 40 and a second capsule type I portion (or segment) 50.

FIG. 2 illustrates a member 10 as a capsule type I 30 in its closed position. From the closed position, or deployable state 180, as illustrated at FIGS. 2, 4A, 4B, and 9, the member 10 can be propelled toward a tree; then due to inertia, the member 10 will separate from at least one of either capsule type I 30, capsule type II, 60, or capsule type III 110 to an attachment state 200, as illustrated in FIG. 7, from which the extension 120 may wrap around a branch, holding the releaser 20 in the air to release the desired pheromones. Then when member 10 contacts a tree branch, the member 10 may wrap around the branch, where it remains to deploy a pheromone into the air to disrupt the mating process of invading insects.

FIG. 3 illustrates another type of member 10. This member 10 may be referred to as the capsule type II 60. The capsule type II 60 may have a first capsule II portion 70, and a second capsule II portion 80. The first capsule II portion 70 may have a first capsule II hollow interior 90. The second capsule II portion 80 may have a second capsule II hollow interior 100.

The capsule type II 60 can be closed as illustrated in FIGS. 4A and 4B. FIG. 4A illustrates the capsule type II 60 with the releaser 20 stowed inside the capsule type II displaced at least one of the first capsule II hollow interior 90 and the second capsule II hollow interior 100. The member 10 may be in this closed position for deployment when in the closed position, referred to herein as the deployment state 180, then after the member is deployed, it may separate to be in the attachment state 200, as illustrated in FIG. 7, then it may wrap around a branch as illustrated in FIG. 8.

Figure 4A:
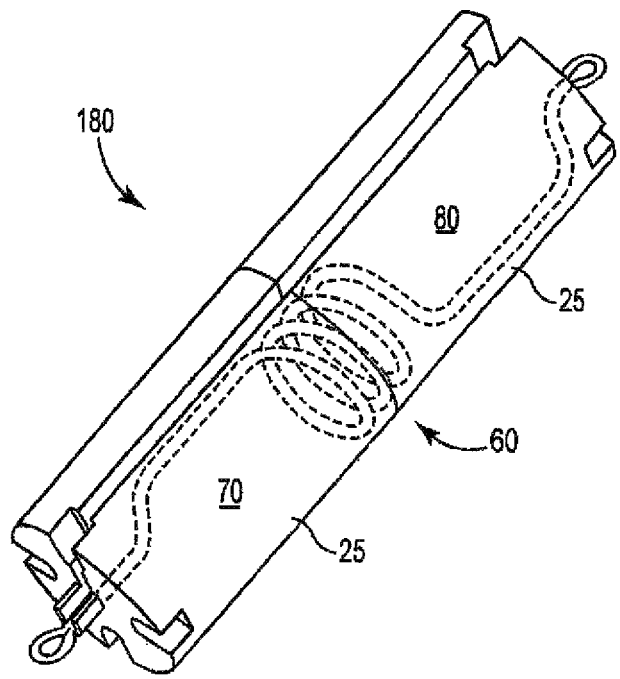
FIG. 4A is a pictorial view of the second embodiment of the member of the present invention in a closed position with the releaser within the capsule.
Figure 4B:
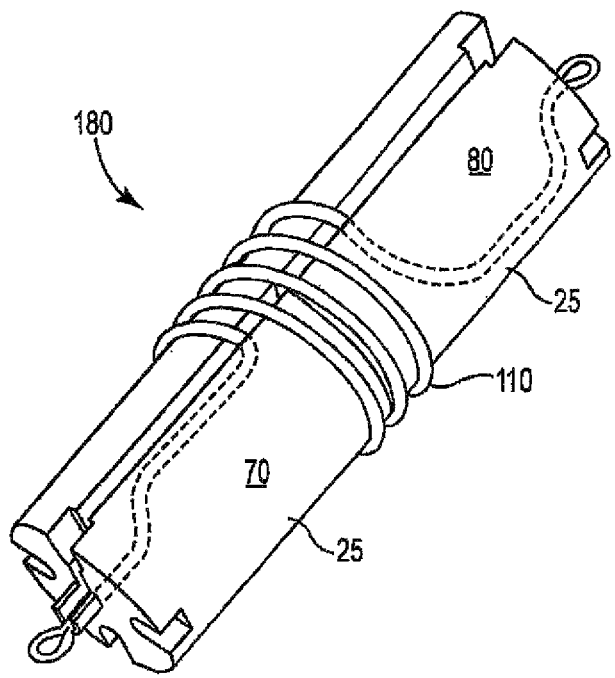
FIG. 4B is a pictorial view of the second embodiment of the member of the present invention in a closed position with the releaser on the outside of the capsule.

FIG. 4B illustrates the capsule type II 60 with the releaser 20 disposed just outside of the capsule type II 60. The application may be the same as described as above, when the releaser 20 is stowed within the capsule type II.

Figure 6:
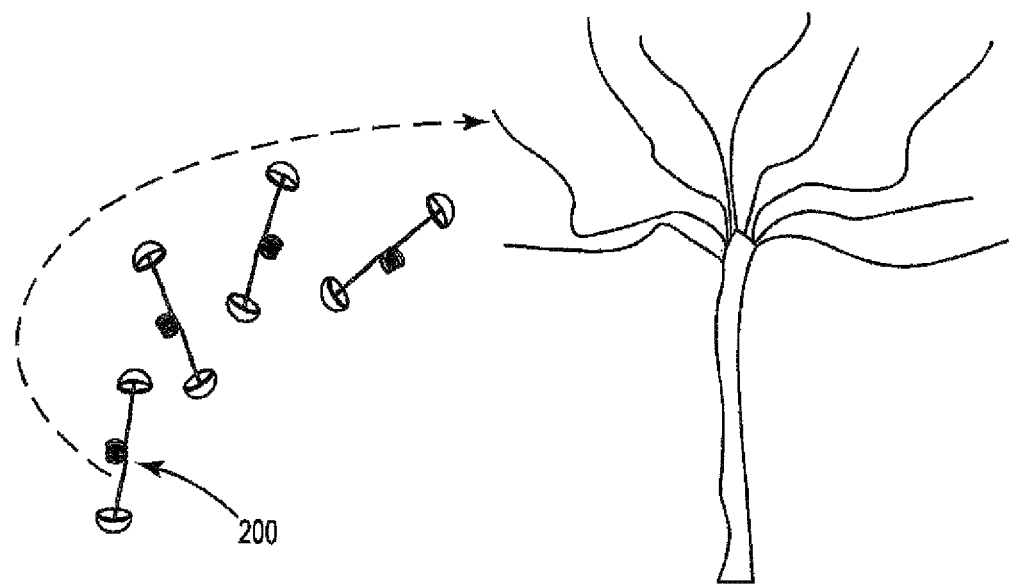
FIG. 6 is a pictorial view of a member being displaced toward a tree branch while in an attachment state.

FIG. 6 illustrates what the capsule 25; here the example used is capsule type II 60 may look like after deployment, and before wrapping around a branch. The releaser 20 may be disposed between two extensions 120, which may terminate at a first capsule II portion 70, and at the opposed end, a second capsule II portion 80. The first capsule II portion 70 may have a first groove 72 that extends linearly so that the extension 120 may be placed through the first groove 72, and tied at a distal end 74. Similarly, the second capsule portion II 80 may have a second groove 82 that extends linearly so that the extension 120 may be placed through the second groove 82, and tied secured at a distal end 84.

FIG. 5 illustrates a gun (or launcher) 130 that may be used to deploy the member 10. For example, a user may point the gun 130 at a tree, and pull a 30 trigger to project the member 10 from the gun toward a branch initially in the deployment state 180, as shown in FIG. 6, and then the member 10 may wrap around a tree branch as illustrated in FIG. 7 when in the attachment state 200.

A launcher or gun may include a barrel that can fit a capsule and through which a capsule may be propelled by any mechanism, such as by gas (e.g., carbon dioxide), compressed air, a mechanical propulsion mechanism such as a spring, etc. The launcher can include features of known carbon dioxide or pneumatic (e.g., compressed air) propulsion mechanisms, such as those used for propelling paint ball devices.

Alternatively, a gun 130 need not be used. Any means of projecting or displacing the member 10 toward a branch will work. For example, one could even throw the member 10 toward the branch.

FIG. 8 is a schematic of the method of practicing the present invention. This illustrates the steps of a method of applying a pheromone onto a tree branch, comprising: positioning (300) a releaser (20) to a first end (122) of an extension (120); positioning (310) a capsule (110) to a second end (124) of an extension (120); positioning (320) the releaser (20) adjacent to the capsule (110) so that the member (10) is in a deployable state (180) (or "deployment state"); and projecting (330) the member (10) in its deployable state (180) whereby inertia causes said releaser (20) to separate from said capsule (110) and form an attachment state (200).

Figure 9:
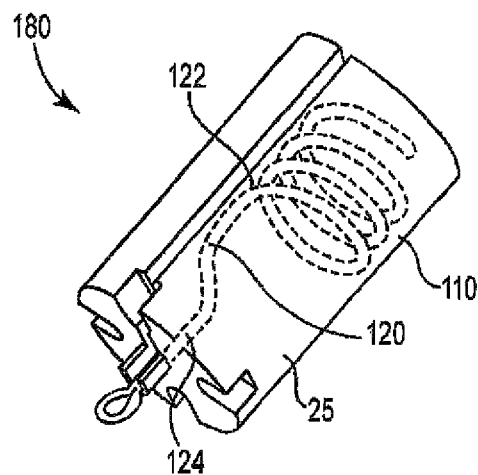
FIG. 9 is a pictorial of the third embodiment in a closed position, with the releaser disposed adjacent to the capsule.
Figure 10:
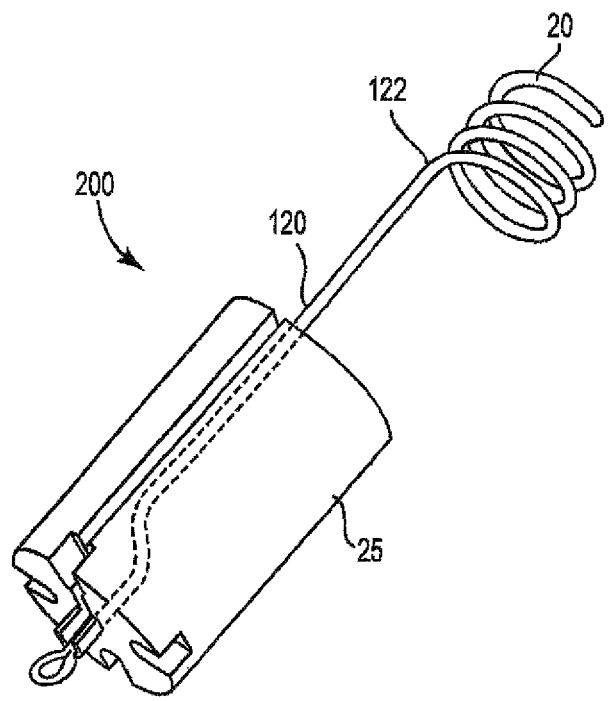
FIG. 10 is a pictorial of a third embodiment of the present invention with the releaser extended from the capsule.

FIGS. 9 and 10 illustrate another embodiment that uses a releaser 20 connected to a capsule III 110 via an extension 120. This may use less parts, and may be cheaper to produce. Upon launch, extension 120 becomes extended (unwound) and can become tangled in a tree branch or other crop. See FIG. 10. FIG. 9 illustrates the embodiment while the releaser 20 is disposed within the hollow capsule II 110, ready for deployment. Although FIG. 9 illustrates the releaser 20 disposed within the capsule II 110, it 20 may be disposed on the outside of the capsule III, as is illustrated in FIG. 4B.

Figure 11:
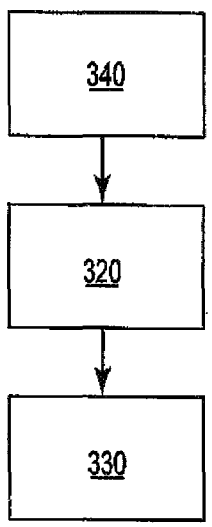
FIG. 11 is a pictorial of a schematic of a method of the present invention.

FIG. 11 illustrates the method of applying a pheromone to a tree, comprising the steps of: positioning (340) a releaser (20) to a capsule (110) via an extension 120; positioning (320) said releaser (20) adjacent to said capsule (110) so that said member (10) is in a deployable state (180); and projecting (330) said member (10) in said deployable state (180) whereby inertia causes said releaser (20) to separate from said capsule (110) and form an attachment state (200).

Figure 12:
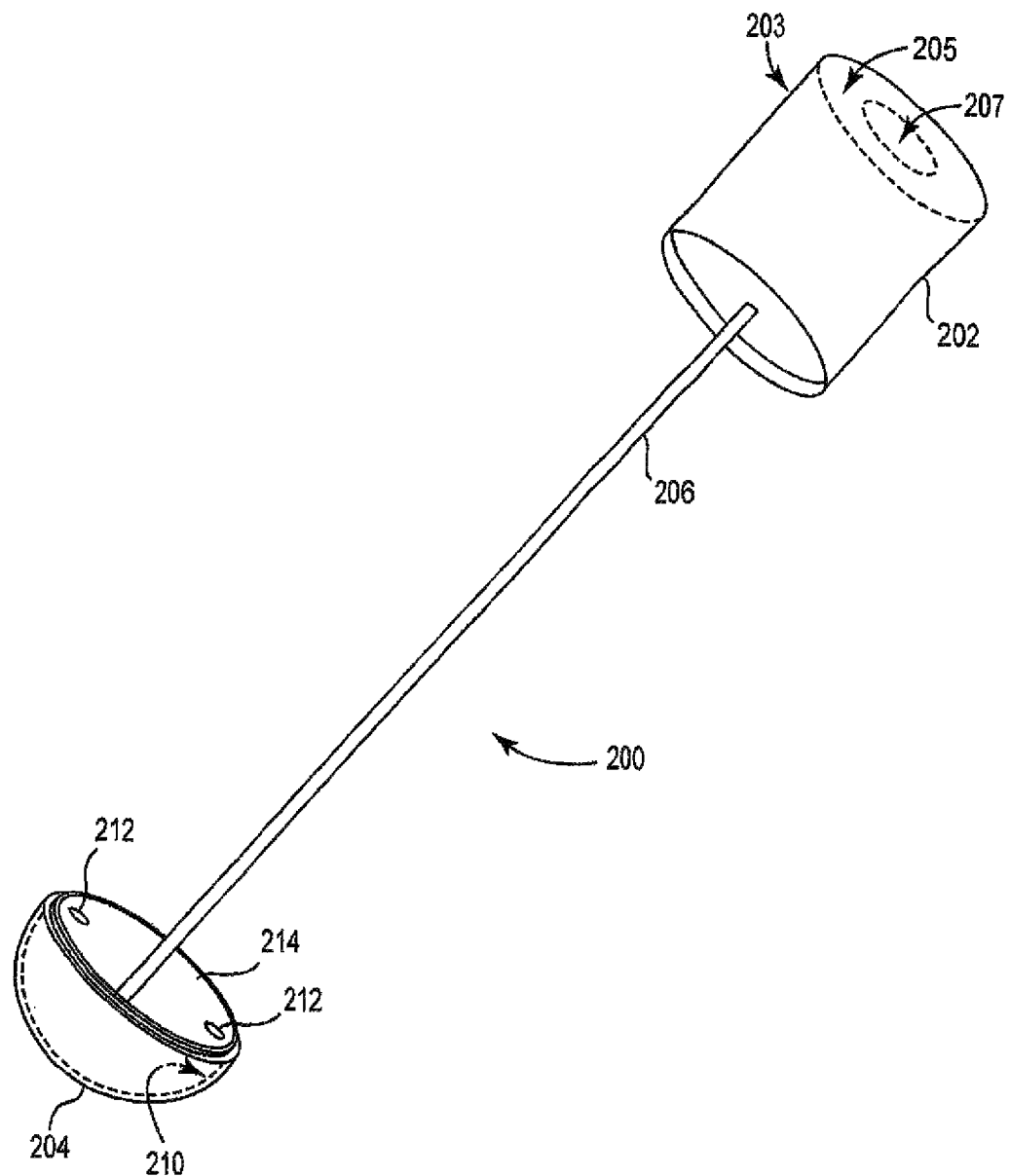
FIG. 12 is a view of an embodiment of a capsule comprising a trap, in an open or attachment state.

FIG. 12 illustrates an embodiment of a device of the invention in the form of a cartridge or capsule 200 having two capsule segments (base 202, cap 204), and tether 206. Capsule 200 is an "attract and trap" embodiment as described. Base 202 includes a cylindrical sidewall 203, bottom 205, and aperture 207. Pressurized gas entering aperture 207, such as from a launcher, can create a relative pressure gradient in the form of a relative high pressure within capsule 200 (when in a closed or deployable state), that causes cap 204 to separate from base 202. Capsule 200 is illustrated in an attachment state wherein base 202 and cap 204 are separated (from connected positions in a deployable state, not shown) yet attached by tether 206. Cap 204 includes a cover 214 to define an internal space or compartment 210, which is the trap portion of the device. An optional attractant can be included at any location on the device such as at cap 202, tether 206, or base 202. Apertures 212 are located on cover 214. An insect may enter compartment 210 through apertures 212 and become trapped within compartment 210. Optionally, adhesive (not shown) may be placed within compartment 210 to improve the effect of the trap.

Figure 13:
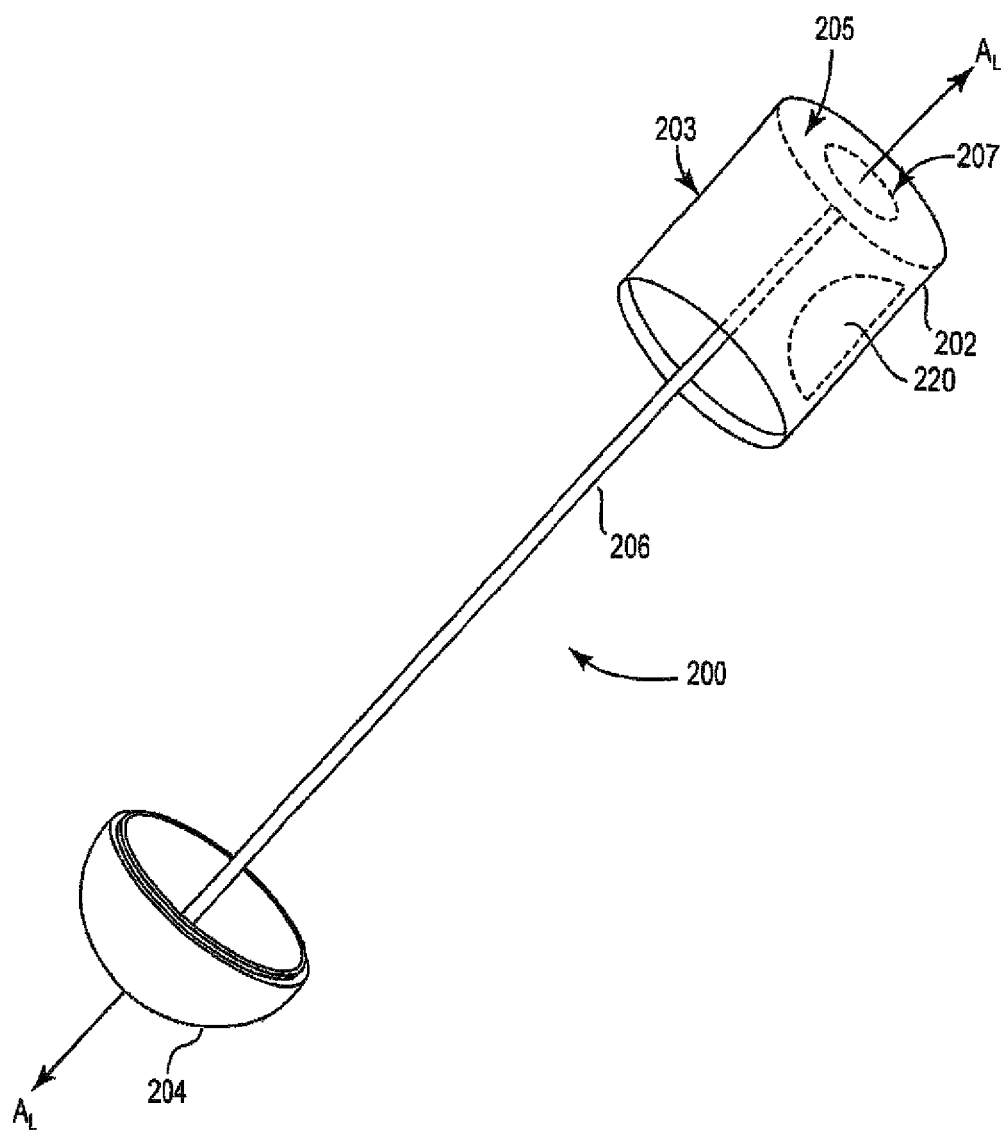
FIG. 13 is a view of an embodiment of a capsule comprising an active agent, in an open or attachment state.

FIG. 13 illustrates an embodiment of a device of the invention as shown at FIG. 12, modified to an "attract and kill" embodiment. Instead of a trap, capsule 200 includes a pesticide at wad or coating 220 at an internal surface of base 202. Wad or coating 220 can be as described herein, including optionally an adhesive, a release matrix, an active agent, or other features as described. An optional attractant can be included at any location on the device, such as at cap 204, tether 206, base 202, or wad or coating 220. In a similar, alternate embodiment, wad or coating 220 could include pheromone, and the pest control device would function based on release of the pheromone.

Figure 14:
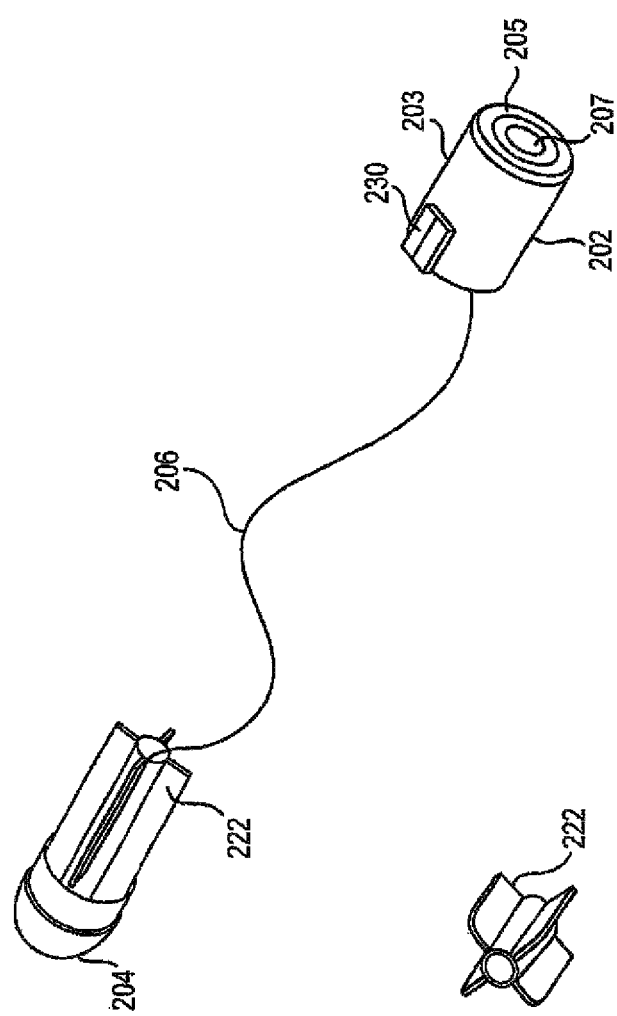
FIG. 14 is a view of an embodiment of a capsule comprising a trap and an active agent (attractant), in an open or attachment state.

FIG. 14 illustrates an embodiment of a device of the invention as shown at FIG. 12, and modified to include a trap including adhesive-coated trap surfaces in the form of fins, as an alternate embodiment of an "attract and trap" device. Instead of a trap located within a compartment of a capsule segment, cap 204 includes attached fins 222 (or other extensions) that are coated with adhesive that catch insects that contact the adhesive. An optional attractant can be included at any location on the device, such as at cap 204, tether 206, base 202, or on fins 222 or in the adhesive coated on fins 222.

Optionally, and as illustrated, base 202 includes (female) slide engagement 230, for attachment of base 202 to a second base having a similar structure include corresponding (opposing, i.e., male) slide engagement. A slide engagement can be any engagement that can allow a capsule segment to attach to another capsule segment, for sliding engagement, e.g., by sliding relative to an adjacent capsule segment in a direction parallel to a longitudinal axis of a capsule, cartridge, or segment. Sliding parallel to the longitudinal axis can allow a series of the capsules to be attached in a "series" or "chain," loaded into a barrel of a launcher, and launched without manually separating the cartridges from each other. In specific, a single capsule or cartridge of a series of attached cartridges can be loaded into a barrel, and can be launched in a direction along the longitudinal axis of the capsule or cartridge; the launching movement in that longitudinal direction launches the cartridge or capsule from the barrel while simultaneously separating the cartridge or capsule from the next (attached) cartridge or capsule in the series; the next cartridge or capsule is then loaded into the barrel and can be subsequently launched, followed by another cartridge or capsule in the series. The slide engagement can be any form of mechanical attachment that allows sliding engagement as described, and may include a female groove (or channel, etc.) into which a male extension slidably inserts.

Figure 15A:
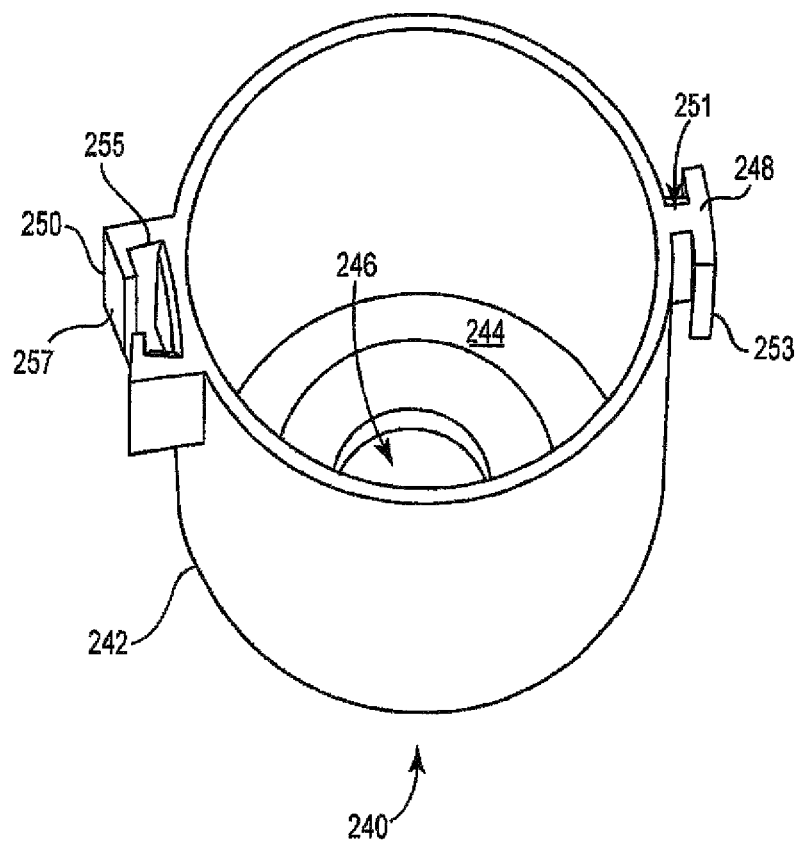
FIGS. 15A and 15B are a views of an embodiment of a base of a capsule.

FIG. 15A (top perspective view) and 15B (bottom perspective view) show preferred embodiments of capsule segment 240, including sidewall 242, bottom 244, bottom aperture 246, male slide engagement 248, and female slide engagement 250. In use, an identical capsule segment 240 can be connected to the illustrated capsule segment 240 in a sliding engagement by sliding male engagement 248 into corresponding female engagement 250, in a direction along a longitudinal axis of both capsule segments. A series of segments can be connected in an aligned fashion and fed into a launcher for sequential launching (see FIG. 16). These segments 240 can include an active agent or trap in any form as described or useful.

Figure 15B:
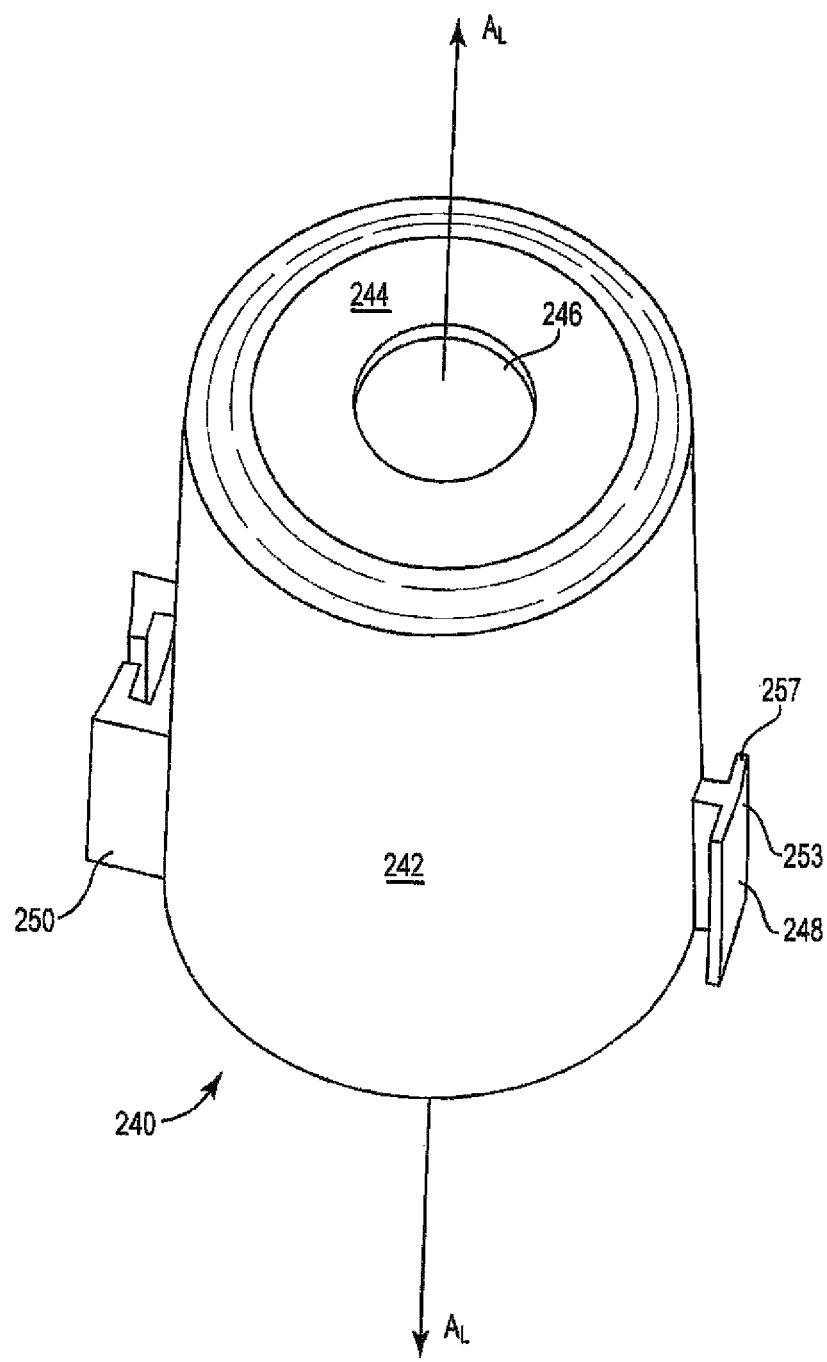

Still referring to FIGS. 15A and 15B, male slide engagement 248 includes an extension 251 having a length dimension along the longitudinal axis of segment 240. Attached at the end of the extension is a cross member 253, forming a "T." As is illustrated, cross member 253 can preferably be curved along a radius of curvature that approximates, matches, or closely matches the radius of curvature of sidewall 242. This shape can correspond to the shape of channel 255 of female slide engagement 250, which is similarly curved and otherwise sized and shaped to slidably fit male slide engagement 248. Optionally and preferably, and as illustrated, outer surface 257 includes a curved surface having a radius of curvature that approximates, matches, or closely matches the radius of curvature of sidewall 242; when a cartridge 240 is slidably engaged with an adjacent cartridge, curved surface 257 can contact an outside surface of the sidewall of the adjacent cartridge, to stabilize the two cartridges and reduce or prevent movement between the two connected cartridges at the slide engagements.

Still referring to FIGS. 15A and 15B, a longitudinal axis ($A_L$) of cylindrical base segment 240 extends through the center of bottom 244 and aperture 246, perpendicular to bottom 244, through the length of the interior of segment 240, and would extend to and through a point at a center of an opposing capsule segment such as a hemispherical cap (not shown). See $A_L$ at FIG. 16.

Figure 16:
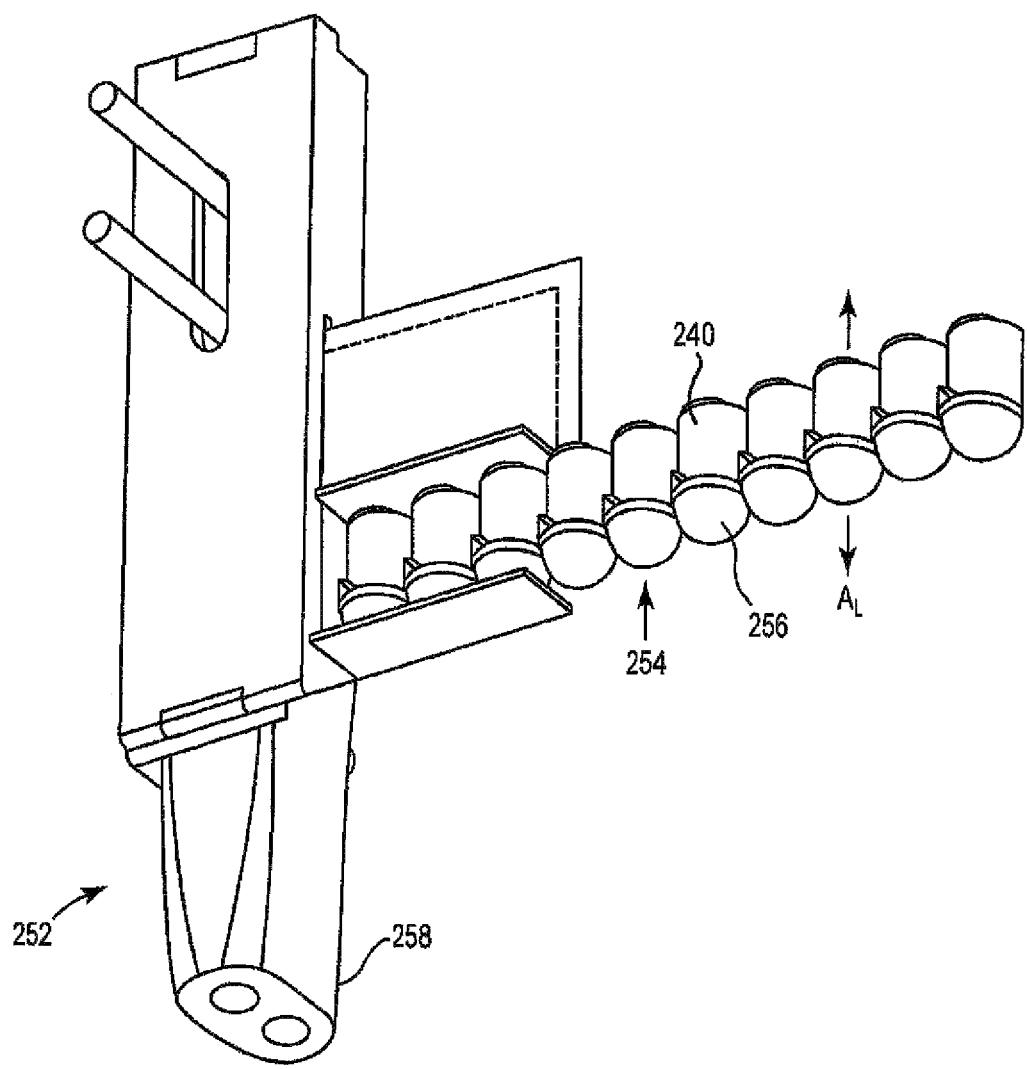
FIG. 16 is a view of an embodiment of a launcher and a series of capsules.

FIG. 16 illustrates a launcher 252 (e.g., pneumatic, using compressed air; carbon dioxide powered, or mechanically powered), with a series of cartridges 254 having cylindrical base capsule segment 240 and hemispherical cap capsule segment 256. A longitudinal axis of a cartridge is represented by $A_L$. (See also FIG. 13.) In use, the series of cartridges 254 (as illustrated, in a deployable state) feed into a barrel of launcher 252, and the launcher is powered to propel a cartridge 254 from the barrel. Pressurized gas is injected into a closed end of the barrel, behind cartridge 254. The gas propels cartridge 254 along the length of the barrel and out of open end 258. The pressurized gas also enters cartridge 254 through aperture 246 to create a positive pressure within cartridge 254. The positive pressure causes cap 256 to separate from base capsule segment 240, causing cartridge 254 to take on an attachment (open) state with segment 256 and segment 240 separated yet still attached by a tether (not shown). In the attachment state, cartridge 254 is propelled to a location of use for cartridge 254 to control pests, such as at a tree branch where cartridge 254 can become attached or tangled. After launch of a cartridge 254, a subsequent cartridge 254 from the series of cartridges 254 can be loaded into the barrel of launcher 252 and launched, followed by still another cartridge 254, for sequential loading and launching.

It should be understood, of course, that the foregoing relates to exemplary embodiments of the invention and that modifications may be made without departing from the spirit and scope of the invention as set forth in the following claims.

The invention claimed is:

1. A method of placing a pest control device at a tree branch, the method comprising:
  providing a pest control device capable of being projected toward the tree branch and held at the tree branch by a tether, the device comprising:
    two segments connected by a tether, the first segment and the second segment being capable of being assembled in a deployable state, and the first segment and the second segment being capable of being separated in a manner such that the first segment separates from the second segment while the first segment remains connected to the second segment by the tether,
    attractant, or
    poison, or
    attractant and poison; and
  propelling the pest control device through a tubular barrel of a launcher, wherein,
  the pest control device is in the deployable state when propelled through the tubular barrel, and
  the first segment and the second segment separate and remain connected by the tether, after the pest control device is propelled through the tubular barrel.

2. The method of claim 1 wherein the launcher propels the device in the deployable state using mechanical power.

3. The method of claim 1 wherein the launcher propels the device in the deployable state using compressed air.

4. The method of claim 1 wherein, in the deployable state, the device comprises an interior, and the attractant, poison, or both, are within the interior.

5. The method of claim 1 wherein one segment is cylindrical.

6. The method of claim 1 wherein in the deployable state, the capsule has a shape that allows projection through a barrel.

7. The method of claim 1 wherein the device comprises attractant.

8. The method of claim 1 wherein the device comprises poison.

9. The method of claim 1 wherein the device comprises attractant and poison.

* * * * *